Aug. 24, 1943.  W. G. LYMAN  2,327,537
BICYCLE BASKET
Filed Jan. 31, 1940  4 Sheets-Sheet 1

Inventor
WENDELL G. LYMAN
By Edwin Liusoke
Attorney

Aug. 24, 1943.  W. G. LYMAN  2,327,537
BICYCLE BASKET
Filed Jan. 31, 1940  4 Sheets-Sheet 2
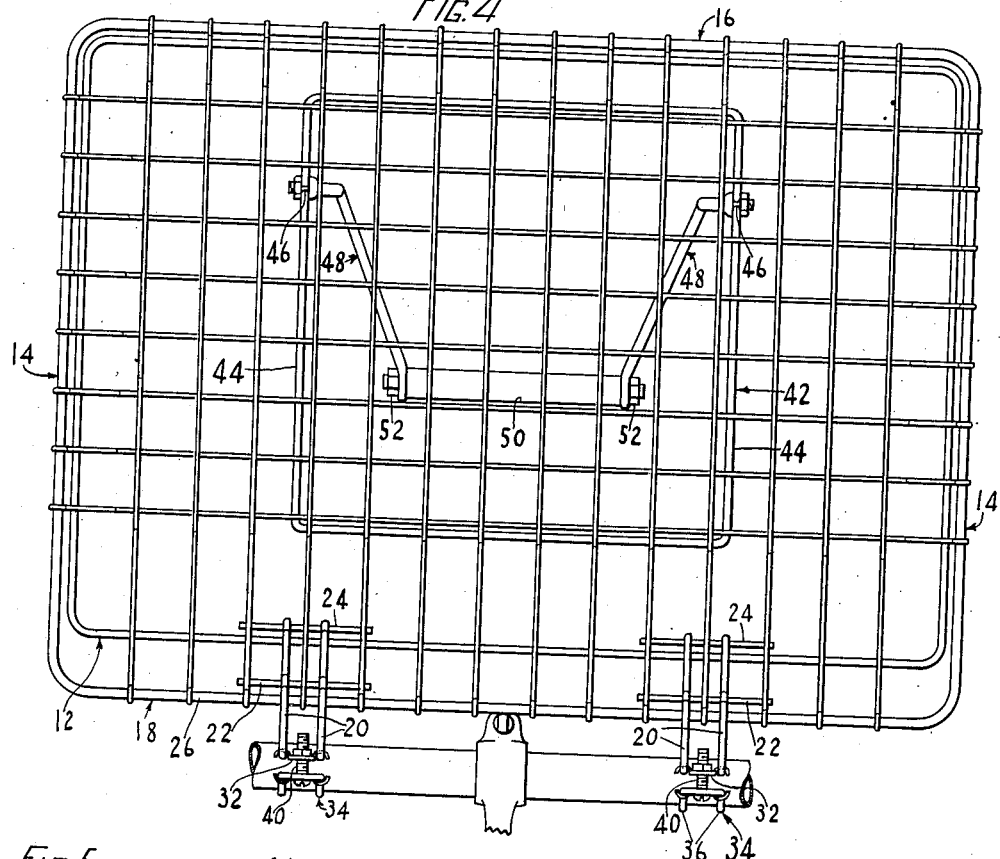
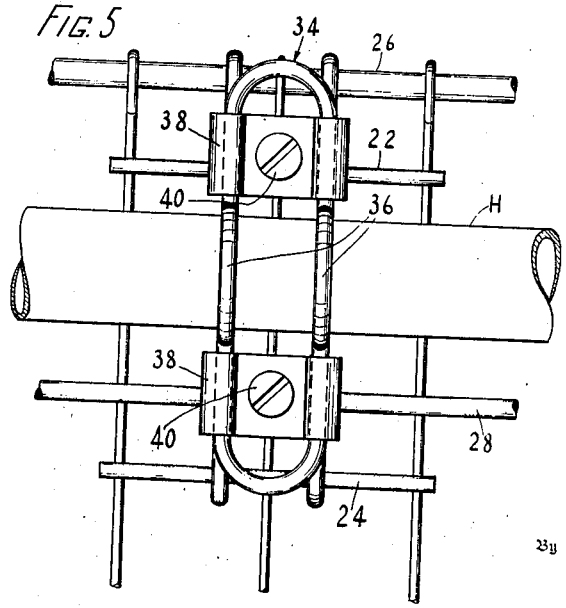
Inventor
WENDELL G. LYMAN
By Edwin Levisohn
Attorney

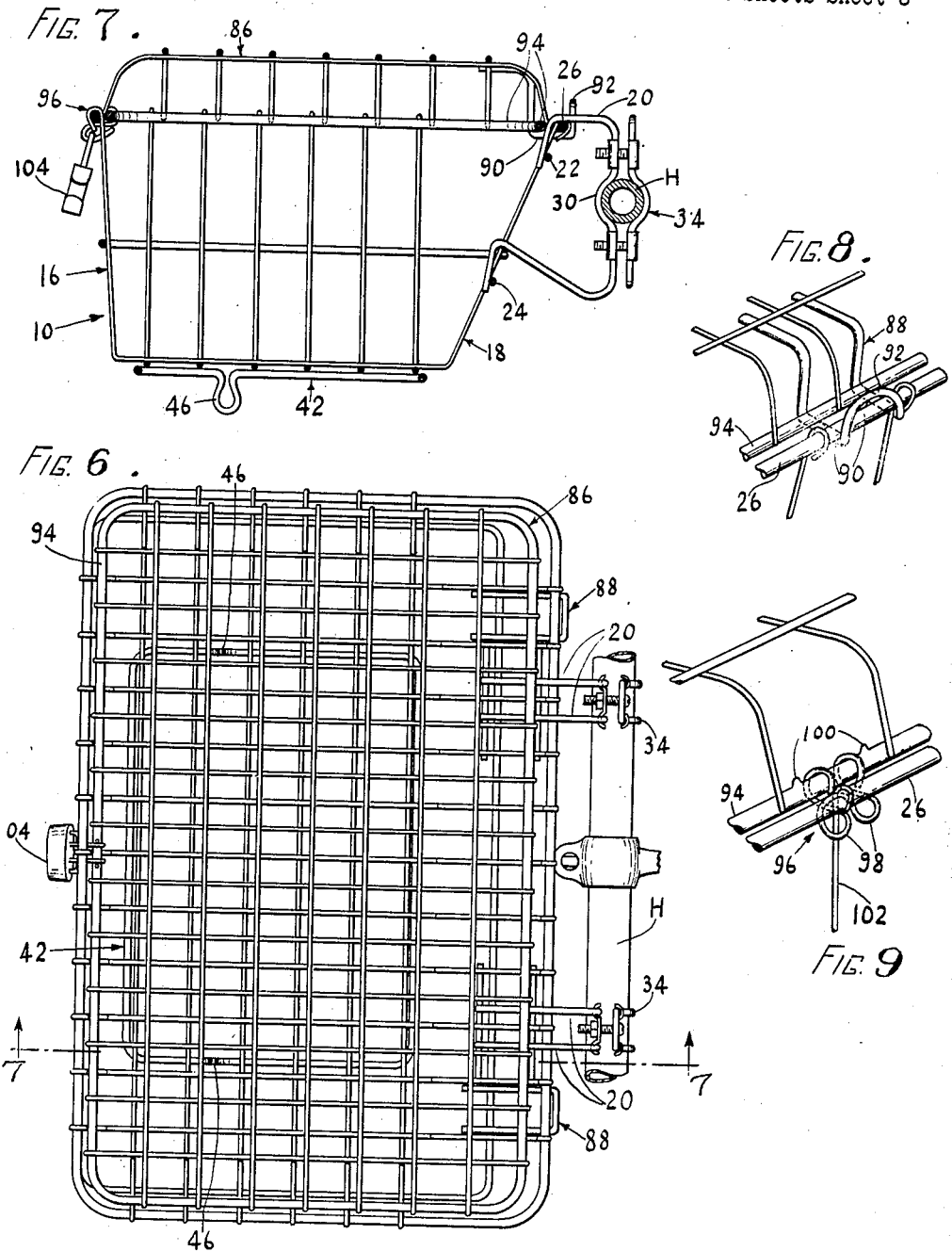

Aug. 24, 1943.  W. G. LYMAN  2,327,537
BICYCLE BASKET
Filed Jan. 31, 1940    4 Sheets-Sheet 4
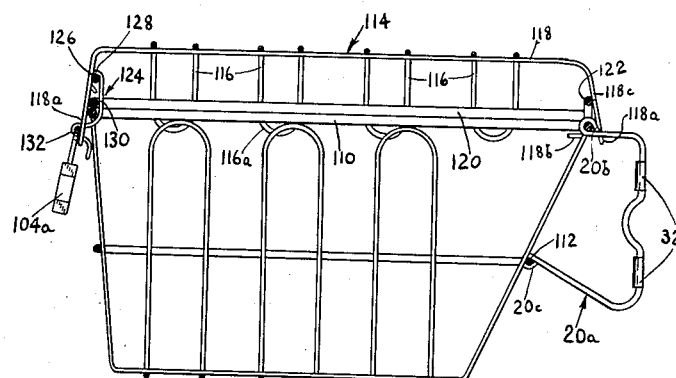
Fig. 11.
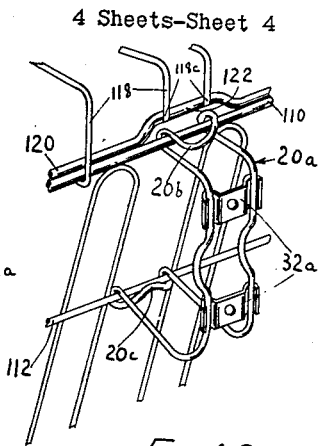
Fig. 12.
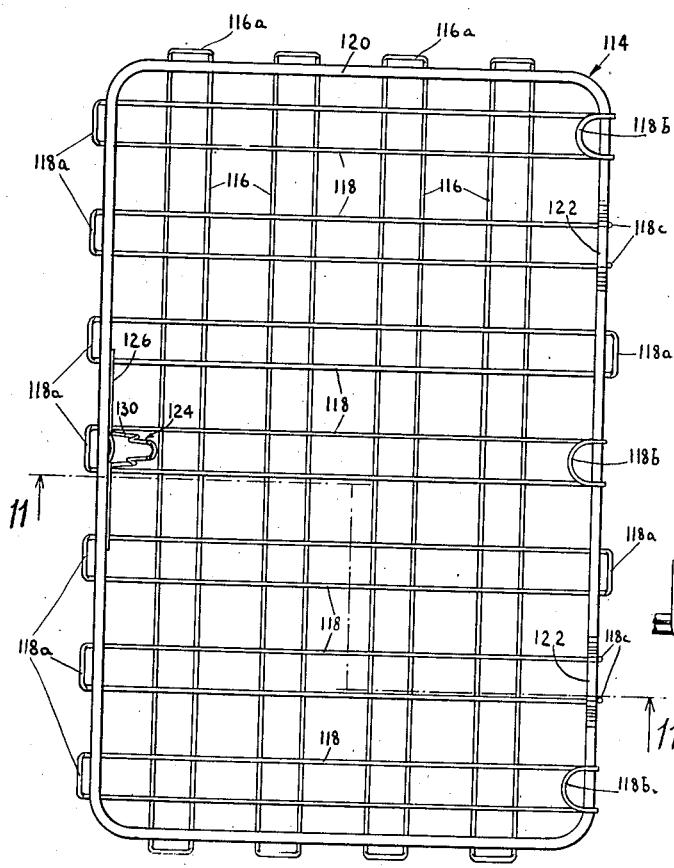
Fig. 10.
Fig. 13.
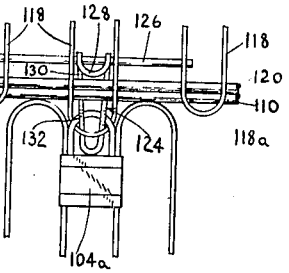
Fig. 14.
Inventor
WENDELL G. LYMAN
By Edwin Leusohn
Attorney Patented Aug. 24, 1943

2,327,537

UNITED STATES PATENT OFFICE 2,327,537

BICYCLE BASKET

Wendell G. Lyman, Brooklyn, N. Y., assignor to D. P. Harris Hardware & Manufacturing Co. Inc., New York, N. Y., a corporation of New York Application January 31, 1940, Serial No. 316,554

5 Claims. (Cl. 224—36)

This invention relates to bicycle baskets.

One object of the invention is to provide a basket adapted to be mounted on a bicycle of the type having real or simulated fork truss rods, which basket is constructed and arranged so that it can be secured to the handle bars of the bicycle and yet clear said truss rods without excessive spacing of the rear wall of the basket from the handle bars. In other words, the basket is constructed so that it can be supported on and mounted close to the handle bars of the bicycle and yet clear the fork truss rods.

Another object of the invention is the provision of a bicycle basket formed substantially entirely of wire and having wire clamping members for supporting the basket on the handle bars, thus providing a bicycle basket which can be easily manufactured in quantities and produced at low cost and which is of improved appearance. In the baskets of the present invention, sheet metal parts are almost entirely eliminated and yet the basket is strong and durable.

A further object of the invention is to provide improved means of simple construction engageable with the basket and with parts of the bicycle below the handle bars for supporting the basket in proper position and preventing downward movement thereof. In this connection a more specific object of the invention is to provide several types of supporting means adapted for baskets of various sizes, respectively.

Another object of the invention is to provide a basket having improved means for clamping the same to the handle bars of the bicycle.

Another object of the invention is to provide a bicycle basket having an improved cover construction.

The above objects of the invention and other objects which might hereinafter appear will best be understood from the following description considered with reference to the accompanying drawings which, while showing the preferred embodiments of the invention, are to be understood as illustrative of the invention and not in limitation thereof.

In the drawings:

Fig. 4 is a top plan view of the basket, showing the same clamped to the handle bars and provided with rods engaged with the bottom of the basket and with the ends of the front axle;

Fig. 5 is a fragmentary rear view of the basket showing in elevation one of the clamping members;

Fig. 6 is a top plan view of a basket provided with a cover therefor;

Fig. 7 is a sectional view on the line 7—7 of Fig. 6;

Fig. 8 is a fragmentary perspective view of the basket illustrated in Fig. 12, showing the hinge connection of the cover with the basket;

Fig. 9 is a fragmentary perspective view of the basket shown in Fig. 6, illustrating the latching device for the cover;

Fig. 10 is a plan view of the inside of a cover, in accordance with another form of the invention;

Fig. 11 is a sectional view on the line 11—11 of Fig. 10 showing the cover in position on the basket;

Fig. 12 is a fragmentary perspective view of the basket and cover illustrated in Fig. 11, showing another form of the clamping member for attaching the basket to the handle bars;

Fig. 13 is a fragmentary perspective view showing a hinge connection of the cover with the basket;

Fig. 14 is a fragmentary front view of the basket shown in Fig. 11, illustrating the latching device for the cover.

Figure 1:
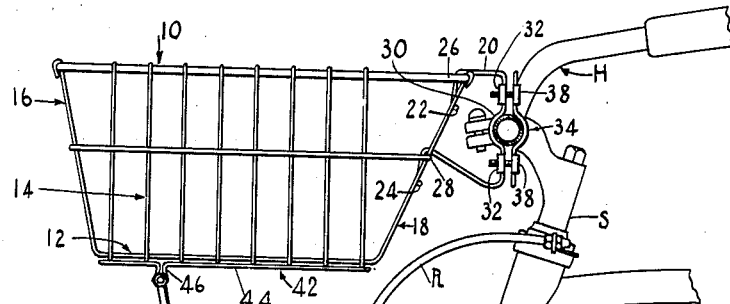
Fig. 1 is a side view of a basket embodying the invention shown mounted at the front of a bicycle.
Figure 2:
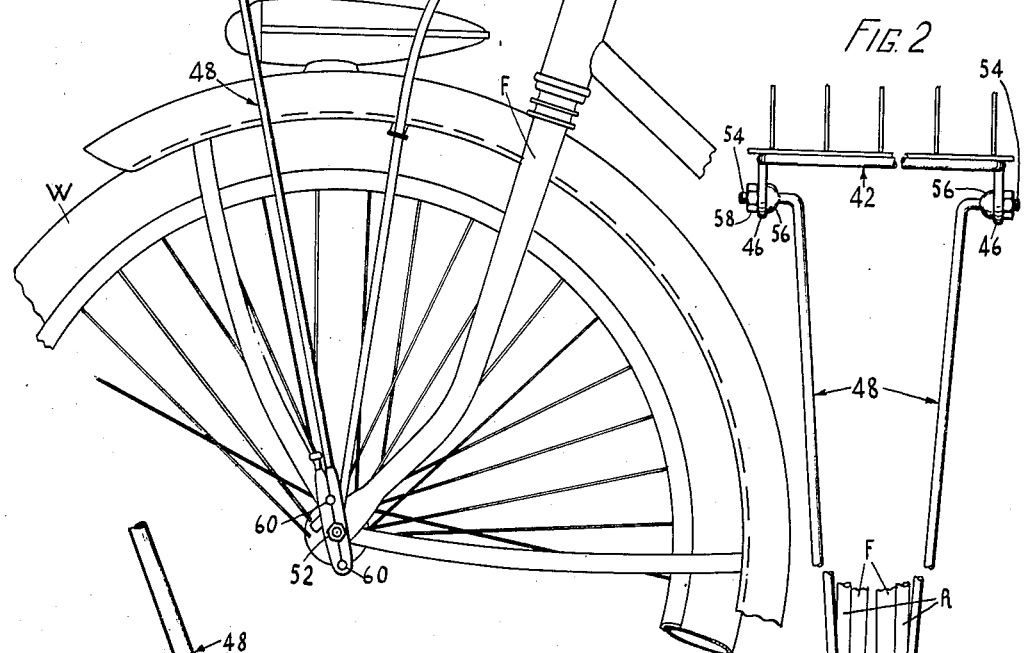
Fig. 2 is a view at the front of the basket, showing only the lower part thereof and showing the rods which engage the bottom of the basket and the front axle for supporting the basket, parts being broken away or omitted for the purposes of illustration.

Referring now to the drawings in detail and first to the form of the invention illustrated in Figs. 1 to 5, the basket 10 made in accordance with said form of the invention consists of a wire body having a bottom wall 12, side walls 14, a front wall 16 and a rear wall 18. Said basket is shown mounted on the handle bars H of the bicycle which has the usual fork F and which also is provided with real or simulated fork truss rods R. By reference to Fig. 1, it will be noted that the basket 10 is mounted over the front wheel W of the bicycle close to the handle bars and yet is supported out of engagement with the fork truss rods R. This is an important feature and object of the invention and for this purpose the rear wall 18 of the basket slopes downwardly and forwardly at a substantial angle. The present basket is thereby distinguished from the conventional bicycle basket in which the front and rear walls slope at equal angles, considerably less than the angle of wall 18, from the top of the basket to the bottom thereof.

The basket is provided with rigid means for clamping the same to the handle bars of the bicycle. Said clamping means comprises clamping members secured to the rear wall of the basket in position to engage the handle bars H in spaced relation at opposite sides of the extension stem S. Said clamping members are formed of rigid wire and each comprises a pair of spaced bent wire rods 20 having upper end portions which are secured as by welding to a short stiff wire rod 22 welded to the rear wall 18 of the basket. The lower ends of said members 20 are similarly secured to lower cross rods 24 similarly fixed as by welding to the rear wall 18 of the basket. The upper ends of members 20 which are secured to cross rod 22 engage over and are welded to the top peripheral wire member 26 of the basket while the lower ends of said members 20 engage over and are welded to a wire member 28 which passes completely around the basket between the top and bottom thereof as shown in Fig. 1. Wire members 20 are provided with intermediate forwardly directed arcuate bent or recessed portions 30 for engaging and conforming to the curvature of the handle bars. Each pair of wire members 20 is provided with a pair of sheet metal clips 32 disposed above and below bent portions 30. Clips 32 are welded to companion members 20. Each clamping member which is fixed to the rear wall of the basket has a co-operating clamping member 34 formed as a wire loop and having laterally spaced intermediate rearwardly directed arcuate bent or recessed portions 36 adapted to engage and conform to the curvature of the handle bars in position confronting the bent portions 30 of clamping members 20. Clips 38 are welded to loops 34 at opposite sides of bent portions 36 thereof, as clearly shown in Fig. 5 in confronting relation to the clips 32 of clamping members 20. Clamping members 20 and 34 are forced into clamping engagement with the handle bars by clamping bolts 40 which pass through companion clips 32 and 38. It will be noted by reference to Fig. 1 that the bent portions 30 and 36 of the clamping members which engage the handle bars are disposed below the top of the basket. This serves to raise the basket so that the top thereof is above the intermediate part of the handle bars and the bottom thereof clears the parts of the bicycle disposed over the front wheel and cooperates with the increased slope of the rear wall 18 to clear the fork truss rods R, it being observed, however, that the upper portions of the clamping members do not extend above the top of the basket. Thus the basket can be of substantial depth.

Figure 3:
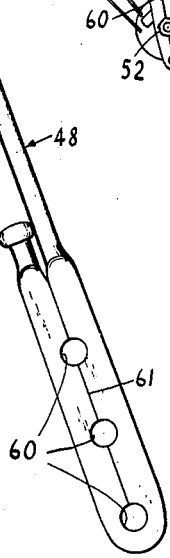
Fig. 3 is a side view on a larger scale of the lower end of a supporting rod.

Provision is made for holding the basket in proper position in which it is clamped to the handle bars and more particularly to prevent downward movement of the basket which might otherwise occur especially when the basket is loaded. The supporting means in addition to the clamping members also assists in holding the basket in proper centered position and makes unnecessary excessive pressure of the clamping members on the handle bars. For this purpose the basket is provided with a wire frame 42 welded to the bottom of the basket, preferably externally thereof, and provided with spaced side rods 44 having downwardly looped portions forming eyes 46. Stiff wire rods 48 are engaged at their upper ends in eyes 46 and at the lower ends said rods engage the opposite ends, respectively, of the front wheel axle 50, at opposite sides of the fork F. The outer ends of axle 50 are threaded for nuts 52 for holding the lower ends of rods 48 in position on said axle as clearly shown in Figs. 1 and 2. Rods 48 are formed at their upper ends with lateral threaded portions 54 and with integral shoulders 56. Lateral threaded portions 54 pass through eyes 46 of frame 42 and are secured in position by nuts 58, said eyes 46 being clamped between shoulders 56 and said nuts. As shown in Fig. 3 the lower ends of rods 48 are provided with a plurality of openings 60 which permit adjustment of rods 48 in engagement with the ends of axle 50. As rod 48 is preferably a relatively slender, although stiff, wire rod of circular cross section, a special construction of the lower ends of said rods to permit the provision therein of openings 60 is provided. For this purpose the lower ends of rods 48 are reflexed and flattened to afford the necessary width for openings 60. The bent ends of rods 48 are welded together along the line of union 61 whereby the bent portion of said ends are integrally united and held from spreading.

The baskets hereinbefore described may be provided with covers. Thus as illustrated in Figs. 6 to 8 the basket 10 is provided with a cover 86 which is removably secured to said basket and removably hinged to the latter by spaced wire members 88. Said hinge and securing member 88 is constructed as shown in Fig. 8, being welded to adjacent wires of cover 86 and having spaced parts 90 engageable under the top wire 26 of the basket. Said parts 90 are connected by an upwardly extending loop portion 92 which engages the rear edge of top wire 26 when cover 86 is engaged with the basket. The lower edge of said cover is constituted by a peripherally extending relatively stiff wire 94 which is disposed close to the top wire 26 peripherally thereof and inwardly of the basket when the cover is in closed position. A latching member 96 is pivotally connected to the lower edge of the cover and more particularly to the front of lower wire 94 of said cover. Said latching member comprises a pair of apertured members 98 pivoted on wire 94 centrally of the front thereof and held against spreading movement by projections 100 formed on said wire. Members 98 are adapted to engage the opposite sides of a central wire 102 of the front walls 16 of the basket in position to receive a lock 104 for locking the cover in closed position on the basket. It will be understood that when lock 104 is removed from members 98 the cover can be moved upwardly and rearwardly with hinge members 88 in engagement with wire 26 and that said cover can be completely removed from the basket if desired. It will be understood that cover 86 can similarly be applied to basket 10a and to other forms of baskets as well.

In the form of the invention illustrated in Figs. 10 to 14 in lieu of clamping members of the construction of the clamping members 20 illustrated in connection with the above described forms of the invention, there are utilized clamping members 20a of the construction illustrated in Figs. 11 and 12. Clamping member 20a comprises an endless loop of wire having upper and lower portions 20b and 20c, respectively, bent around and fixed to upper wire 110 and intermediate wire 112, respectively, of the basket. Clamping members 20a are provided with clips 32a which may be of the same construction as the clips 32 of clamping members 20. It will be understood that a companion clamping member which may be similar to the clamping member 34 is associated with each clamping member 20a for engagement with the handle bars of the bicycle for securing the basket thereon.

The cover 114 of the basket shown in Fig. 11 is composed of a plurality of endless looped wires 116 fixed to similar endless looped wires 118 and to a bottom rim wire 120. When cover 114 is mounted on the basket the outer ends 116a and 118a of wire members 116, 118, respectively, project downwardly beyond upper rim wire 110 of the basket externally of said rim wire in close engagement therewith, at the four sides of the basket except that at the rear of the basket certain of the members 118 have their ends bent under as indicated at 118b in position to engage under rim wire 110 of the basket when the cover is in position thereon. Also, as shown in Figs. 11 and 12, the rear part of rim wire 120 of the cover has upwardly bent portions 122 which, when the cover is in position on the basket, straddle the upper looped ends 20b of clamping members 20a, and at these points of the cover, wires 118 terminate in spaced ends 118c which are secured to the upwardly offset parts 122 of rim wire 120.

The latch for cover 114 comprises an endless looped wire pivotally mounted on a wire rod 126 welded to wires 118 centrally of the front of the cover. More specifically, the upper looped end 128 of latch 124 is bent around wire 126 in pivotal engagement therewith and said latch has a downwardly extending portion 130 which projects across rim wires 110 and 120 inwardly of the basket and which has a forwardly projecting portion 132 which extends between the companion wires of a central endless wire 118 below said wire rim 110 of the basket forming an eye for the insertion of the bolt of the lock 104a.

While I have shown and described several forms of the invention it will be understood that the latter may be embodied otherwise than as here shown. It will be understood also that in each of the forms of the invention herein shown or described certain changes in the details of construction and in the arrangement of parts can be made and will occur to skilled artisans particularly in view of the present disclosure. Therefore, I do not wish to be limited to the constructions herein shown or described or to any of them except to the extent which may be required by the scope of the appended claims.

Having thus described my invention, what I claim and desire to secure by Letters Patent is:

1. A bicycle basket formed of wire and comprising a bottom wall and walls including a rear wall upstanding from said bottom wall, clamping members secured to said rear wall, said clamping members being in laterally spaced relation, and companion adjustable clamping members to secure the basket to the handle bars of the bicycle, said rear wall comprising vertically spaced horizontal wires, each of said first mentioned clamping members being formed of wire and having a vertically disposed part provided with an intermediate forwardly directed recessed portion, adapted to engage the adjacent portion of the handle bars, and forwardly extending end parts fixed to said rear wall at vertically spaced points, respectively, said end parts being looped around said spaced wires, respectively, for securing said first mentioned clamping members to said rear wall of the basket, each of said companion clamping members comprising an endless wire member having a vertically disposed part provided with an intermediate rearwardly directed recessed portion cooperating with said first mentioned recessed portion to embrace the adjacent portion of the handle bar, each of said clamping members having apertured transverse parts above and below said recessed portion, and means engageable with the companion clamping members in said apertured transverse parts for releasably holding said companion clamping members in clamping relation.

2. A bicycle basket formed of wire and comprising a bottom wall and walls including a rear wall upstanding from said bottom wall and including vertically spaced wires, clamping members comprising endless wire members secured to said rear wall at points spaced vertically thereof, and companion adjustable clamping members to secure the basket to the handle bars of the bicycle, said first mentioned clamping members having looped ends bent around said spaced wires, respectively, for securing said members to said rear wall of the basket.

3. A bicycle basket formed of wire and comprising a bottom wall and walls including a rear wall upstanding from said bottom wall and including vertically spaced wires, clamping members comprising endless wire members secured to said rear wall, and companion adjustable clamping members to secure the basket to the handle bars of the bicycle, each of said first mentioned clamping members having a vertically disposed part provided with an intermediate forwardly directed recessed portion, adapted to engage the adjacent portion of the handle bars, and forwardly extending end parts fixed to said rear wall at vertically spaced points, each of said companion clamping members having a vertically disposed part provided with an intermediate rearwardly directed recessed portion cooperating with said first mentioned recessed portion to embrace the adjacent portion of the handle bar, said first mentioned clamping members having looped ends bent around said spaced wires, respectively, for securing said members to said rear wall of the basket.

4. A bicycle basket formed of wire and comprising a bottom wall and walls including a rear wall upstanding from said bottom wall and including vertically spaced wires, clamping members comprising endless wire members secured to said rear wall, and companion adjustable clamping members to secure the basket to the handle bars of the bicycle, each of said first mentioned clamping members having a vertically disposed part provided with an intermediate forwardly directed recessed portion, adapted to engage the adjacent portion of the handle bars, and forwardly extending end parts fixed to said rear wall at vertically spaced points, each of said companion clamping members having a vertically disposed part provided with an intermediate rearwardly directed recessed portion cooperating with said first mentioned recessed portion to embrace the adjacent portion of the handle bar, said first mentioned clamping members having looped ends bent around said spaced wires, respectively, each of said clamping members having apertured transverse parts above and below said recessed portion, and means engageable with the companion clamping members in said apertured transverse parts for releasably holding said companion clamping members in clamping relation.

5. A bicycle basket comprising means for securing the basket to the handle bars of a bicycle, means secured to the bottom of the basket and provided with apertures located adjacent the bottom of the basket at laterally spaced points at equal distances from the adjacent ends, respectively, of the basket, and a pair of slender rods having transverse portions at their upper ends engageable in said apertures, respectively, and openings at their other ends respectively, for engaging the latter over the ends of the front axle of the bicycle with the rods positioned at opposite sides, respectively, of the front wheel of the bicycle, said last mentioned end of each of said rods having an upwardly bent portion extending longitudinally of and contiguous to the adjacent part of the rod and secured thereto, whereby said last mentioned end of the rod is wider than the part extending upwardly therefrom, said opening in said last mentioned end of the rods being formed partly in said upwardly bent portion and partly in said adjacent part.

WENDELL G. LYMAN.